United States Patent

Moreno

[11] Patent Number: 6,042,076
[45] Date of Patent: Mar. 28, 2000

[54] FASTENING DEVICE FOR VEHICLE ACCESSORIES

[75] Inventor: Ricardo Poveda Moreno, Sao Bernardo do Campo, Brazil

[73] Assignee: Metagal Industria e Comercio Ltda, Sao Paulo, Brazil

[21] Appl. No.: 08/559,745

[22] Filed: Nov. 15, 1995

[30] Foreign Application Priority Data

Apr. 27, 1995 [BR] Brazil ................................. 9501621

[51] Int. Cl.[7] .................................................. B60R 1/00
[52] U.S. Cl. ................................... 248/467; 248/222.11
[58] Field of Search .................................. 248/466, 467, 248/468, 222.11, 220.22, 221.11, 222.12, 222.13, 224.51, 224.61, 224.7

[56] References Cited

U.S. PATENT DOCUMENTS

| 716,713 | 12/1902 | Hughes | 248/222.11 X |
|---|---|---|---|
| 813,537 | 2/1906 | Townsend | 248/222.11 |
| 1,709,144 | 4/1929 | Mueller | 248/222.11 |
| 4,632,348 | 12/1986 | Keesling et al. | 248/222.11 |
| 4,936,533 | 6/1990 | Adams et al. | 248/222.11 |
| 4,948,085 | 8/1990 | Mittelhäuser | 248/222.11 X |
| 5,058,851 | 10/1991 | Lawlor et al. | 248/222.13 X |
| 5,151,828 | 9/1992 | Sugimura | 248/222.13 X |

*Primary Examiner*—Ramon O. Ramirez
*Assistant Examiner*—Anita M. King
*Attorney, Agent, or Firm*—Michael J. Striker

[57] ABSTRACT

A fastening device for vehicle accessories has a support pad attachable to a windshield of a vehicle, a support base connected with the support pad and connectable with a rearview mirror, and a resilient locking element pressing the support pad and the support base against one another and formed so that during an assembly and a disassembly of the support base and the support pad different stresses are generated such that a stress generated during the assembly of the support base and the support pad is smaller than a stress generated during the disassembly of the support base and the support pad.

11 Claims, 3 Drawing Sheets

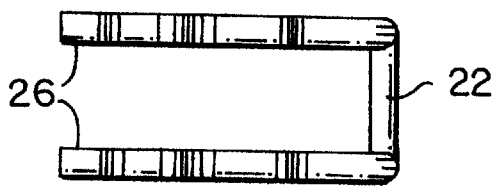
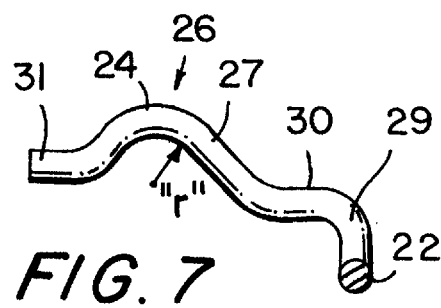
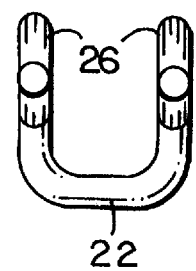
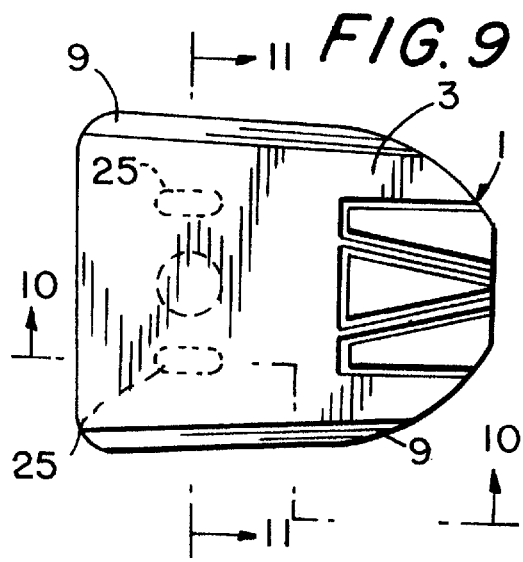
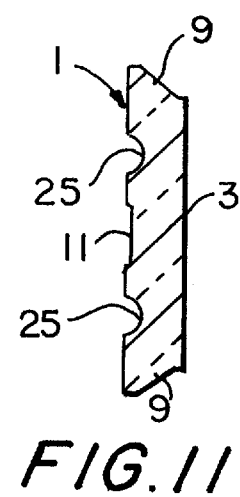
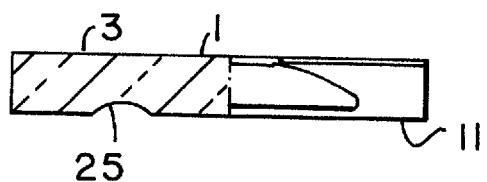

FASTENING DEVICE FOR VEHICLE ACCESSORIES

BACKGROUND OF THE INVENTION

The present invention relates to a fastening device for vehicle accessories.

Fastening devices of the above mentioned general type are known in the art. For fastening devices it is important to provide a simple assembly and disassembly and to avoid plays between the parts in the course of time. The fastening devices for automotive vehicle accessories are used for interior rearview mirrors, which are usually mounted or inserted into a support base attached to the front windshield of a vehicle. A known attachment of this type includes one support base fixed on the windshield with an adhesive, such as a glue or a double face adhesive tape and a support assembly which usually has a base attached to a support pad by a swallow tail-type fitting. An intermediate metal tube and a pivot are incorporated in the rearview mirror. The rearview mirror is also provided with an internal spring and a plastic retainer for prestressing the spheres of the base and pivoting to the opposite direction of the metal tube flanging so as to produce a torque in order to move the assembly. The thusly formed support has multiple adjustment possibilities and due to the torque it maintains the adjustment of the interior rearview mirror in a position chosen by the driver.

The above described system has been widely used since always allows a good coupling between the base and the pad and also it can be made from easily manufactured low cost parts. The swallow tail fitting system which acts between the pad and the base has been also widely used since it always allows for a good coupling between the parts, even if they have differences in dimensions or other differences due to their manufacture. Therefore the assembly is easy to manufacture and at the same time has a low cost.

The above described system has however some disadvantages. In order to maintain the pad and the base always coupled without play, a screw tightened through a threaded hole of the base and compressing against the pad is utilized. Thereby the two coupled parts are stabilized without play. The screw is usually fitted on the vehicle assembly line during the installation of the interior rearview mirror onto the windshield with the use of tools such as a pneumatic screwdriver. However, the tools are very fast and cause many screws, whose material is considerably harder than that of the base, to end up damaging the thread, harming the productivity of the assembly line and causing undesirable rejects. Besides these manufacturing problems, the known system also presents some problems during its use. Due to the car vibration, many of these screws become loose, damaging the driver's rear view. In order to solve this problem, the car owner has to tighten the screw to be able to see out of the mirror again. Another problem recognized in the above described system is that the assembly becomes too rigid and thereby all vibrations produced by the vehicle are transmitted through the windshield to the rearview mirror, harming the rear visibility.

SUMMARY OF THE INVENTION

Accordingly, it is an object of the present invention to provide a fastening device for vehicle accessories, which avoids the disadvantages of the prior art.

In keeping with these objects and with others which will become apparent hereinafter, one feature of the present invention resides, briefly stated, in a fastening device which includes a known pad glued to a windshield, a base fitted on the pad through a swallow tail fitting which incorporates a part of a rearview mirror articulated assembly device, and wherein a resilient locking device of the base onto the pad is provided.

When the fastening is designed in accordance with the present invention no play can be formed between the parts, and the assembly of the base to the pad and disassembly of the base from the pad can be performed without special tools, thereby eliminating the inconvenience of the known systems.

In accordance with the present invention means for assembling the locking spring onto the support base by pressure is provided. Also, clamping means for clamping the locking spring onto the support pad is provided for generating the different assembly/disassembly stresses.

The resilient locking device is formed, in accordance with the present invention, as a locking spring which has corresponding portions cooperating with the support base and the support pad so as to be held between the support pad and the support base, and resiliently press them against one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 6–8 are views showing a spring of the inventive fastening device, in a plan view, side view, and from a free end, respectively; and FIGS. 9–11 are views showing a support pad of the inventive fastening device in a plan view, and in sections taken along the lines D—D and E—E, respectively.

DESCRIPTION OF THE PREFERRED EMBODIMENTS

Figure 1:
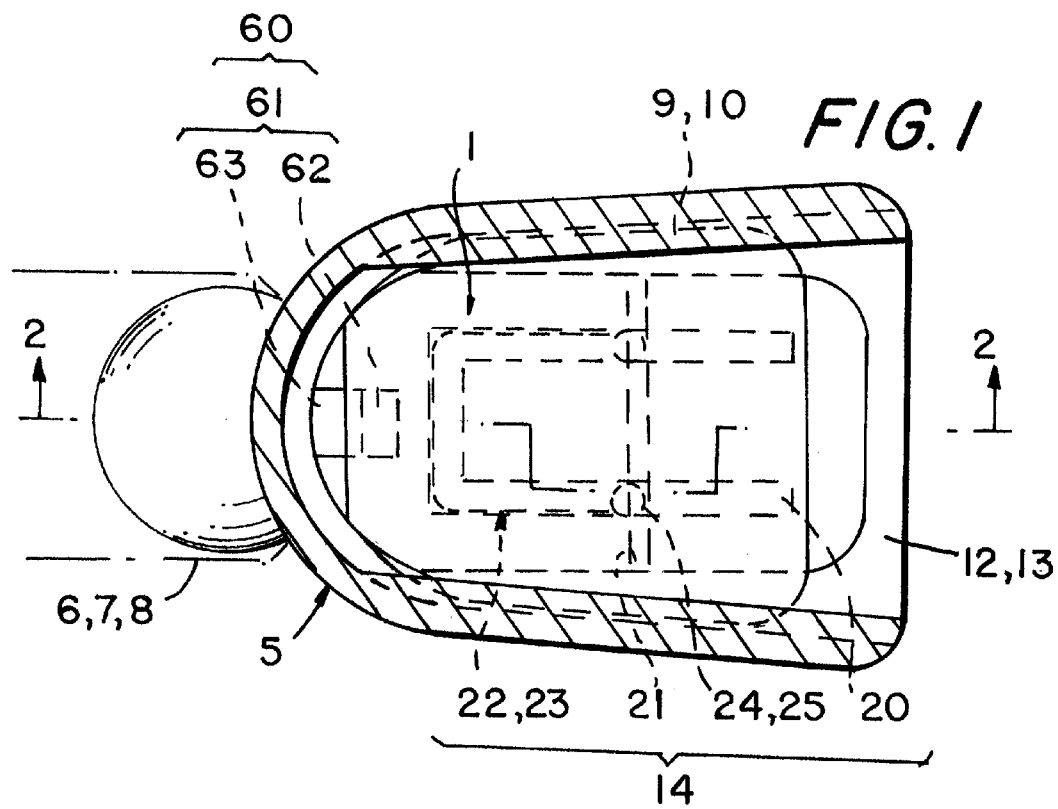
FIG. 1 is a view showing a support for an interior rearview mirror with a fastening device in accordance with the present invention, as seen in a plan view from a face which contains a support pad.
Figure 2:
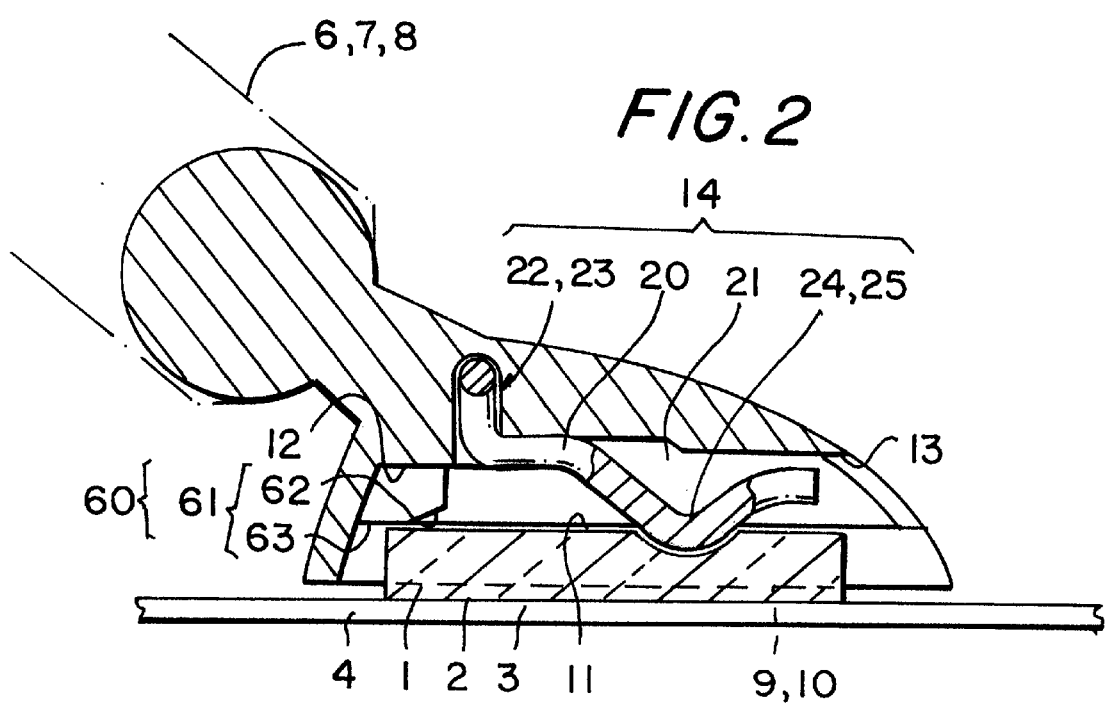
FIG. 2 is a view showing a section taken along the line A—A in FIG. 1.
Figure 3:
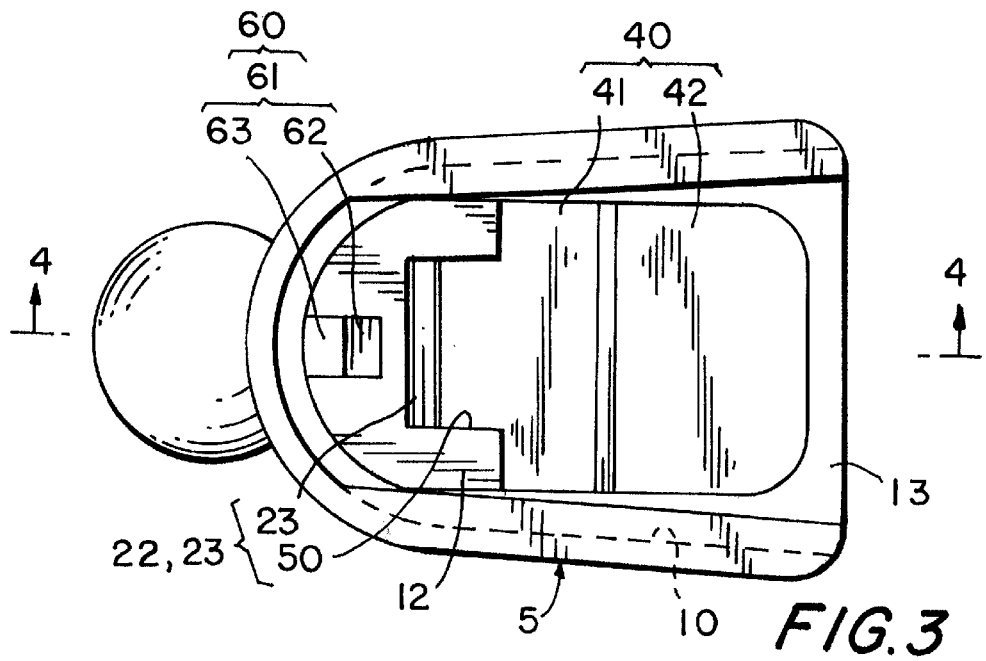
FIGS. 3–5 are views showing a base support of the inventive fastening device on a plan view from the face which fits into the pad, and in sections taken along the lines B—B and C—C, respectively.
Figure 4:
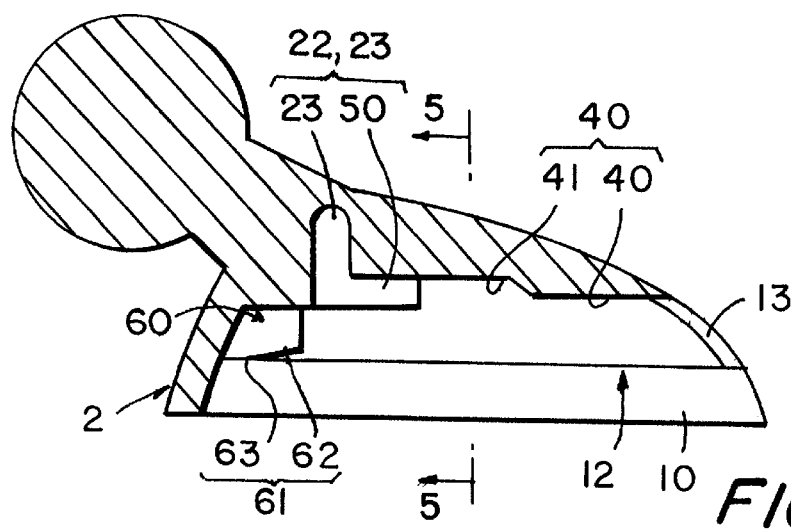
Figure 5:
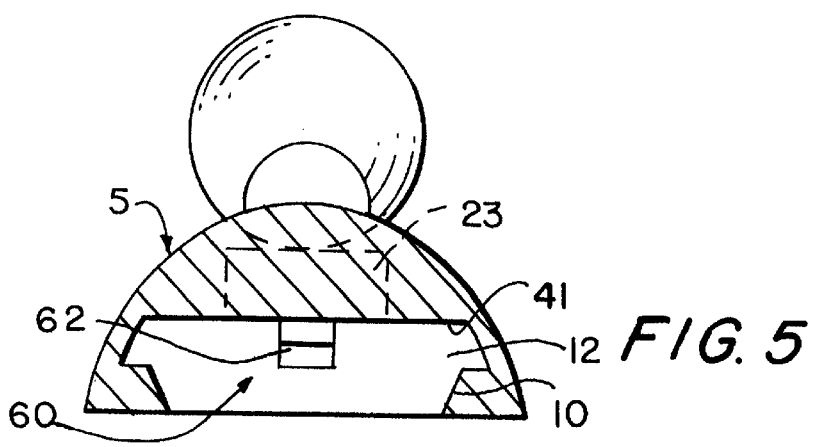

The fastening device for vehicle accessories in accordance with the present invention is shown and described as embodied in a fastening device for attachment of an interior rearview mirror. The fastening device includes a support pad 1 having a transverse trapezoidal section. An adhesive layer 2 composed of a glue or a double face adhesive tape is sandwiched between a smaller base 3 of the support pad 1 and a windshield 4. A support base 5 is dove-tailed in the support pad 1 and provided with a part 6 of an articulated mounted device 6, 7 of a rearview mirror assembly 8 which produces a stabilizing torque of the mirror in a desired position. A dove-tail type fitting 9, 10 is provided for fitting of the support pad 1 and the support base 5. It is composed of pairs of opposed oblique faces and substantially oriented in a parallel direction to the fitting direction of the support pad and the support base 5. In particular, the first oblique faces 9 are provided in the support pad 1 and extend divergingly relative to one another in direction of the smaller base 3 to a larger, opposing base 11 of the support pad. The second oblique faces 10 are provided in opposite sides of a fitting groove 12 on a face of the support face 5 which is turned toward the support pad 1 and have an open end 13.

The fastening device in accordance with the present invention has a locking device 14 for locking the support base 5 to the support pad 1. The locking device 14 in accordance with the present invention is resilient. The locking device 14 has a locking spring 20 located between the support pad 1 and the support base 5 and formed and arranged so that it presses the oblique faces 9 and 10 against one another. The locking spring 20 is accommodated in a space 21 which is defined between the large base 11 of the supporting pad 1 and a bottom of the fitting groove 12 of the base support 5.

The locking spring 20 in accordance with the preferred embodiment has a filiform configuration and has a U-shape with an L-shaped profile. It has a transverse seating branch 22 and two equal end coplanar branches 26 extending perpendicularly from the seating branch 22. The branches 26 are parallel to one another and extend in a fitting direction of the support pad 1 and the support base 5. They have a profile providing locking between the support pad 1 and the support base 5. Each of the branches 26 has an intermediate V-shaped locking fold 27 with a concavity facing toward the support base 5 and with a vertex 24 which is pressed against the larger base 11 of the support pad 1. An intermediate rectilinear locking part 29 extends in an opposite direction from the vertex and pressed against the bottom of the fitting groove 12. A rectilinear end part 30 is perpendicular to the intermediate rectilinear part 29 and connected to the transverse part 22. Finally, a free end rectilinear part 31 is formed so that under normal assembly conditions and during the assembly support base 1 and the support base 5 it does not touch the support pad and the support base and rests against the bottom of the fitting groove 12 of the support base 5.

The locking folds 27 have a radius of curvature which is slightly greater than the height of the space 21 which accommodates the spring 20 between the support pad 1 and the support base 5. In view of this, during the assembly of the support base 5 onto the support pad 1, when the vertex 24 of the locking fold 27 of the spring 20 fits on the larger base 11 of the pad 1, the contact between the parts is maintained since the differences in the height of the space 21 which could eventually exist are compensated by the action of the spring. Therefore no extremely stringent tolerances are needed for manufacture of the pad 1 and the base 5, thus facilitating and reducing the manufacturing costs of these parts.

The space 21 for accommodating the locking spring in the housing includes a recess 40 formed in the bottom of the fitting groove 12. The recess 40 has a staggered bottom including a deeper area 41 and a shallower part 42. The intermediate rectilinear parts 29 of the locking spring 20 are pressed against the deeper area 41 while the end rectilinear parts 31 of the locking spring are pressed against the shallower part 42 of the bottom of the recess 40.

Mounting of the locking spring 20 to the support base is provided by cooperation of a transverse groove 23 formed on the bottom of the recess 40, the transverse branch 22 and the end parts 30 of the locking spring housed in the groove 23, and catches 50 defined on the sides of the recess 40 as well as by a lateral confinement of the interconnecting end part 30 of the spring.

Clamping of the support pad 1 onto the support base 5 is performed by cooperation of the locking folds 27 of the parallel branches 26 of the locking spring and recesses 25 formed on the smaller base 11 of the support pad 1 on which the respective vertices 24 of the spring are secured. Therefore an additional forcing component is generated during the disassembly of the support base 5 from the support pad 1.

The thusly formed clamping device 24, 25 for clamping the support pad 1 and the support base 5 has a differentiated assembly/disassembly stresses. Therefore a difference exists between the assembly and disassembly stresses of the base 5 on the pad 1. During the assembly, the sole resistance to movement is caused by the pressure of the locking folds of the spring 20 against the pad 1 so as to generate some friction. However, during the disassembly, since the two locking folds 27 are secured in the recesses 25 of the pad 1, at the moment of disassembling, an additional component to the resistance of movement is generated, causing the disassembling stress to be greater than the assembling stress.

The advantage of this construction and operation is that the operator of an assembly who for example is compelled to assemble a large number of mirrors a day, will not become so tired during this operation, since the system allows the use of a lesser assembly stress. Although for the disassembly the stress being greater, the supporting set remains firmly fixed to the pad. However, if it is necessary to disassembly the system, it is possible to perform it without any auxiliary tools, as done during the assembly. An additional advantage of the fastening device in accordance with the present invention which uses the spring between the base and the pad consists in the fact that the vibrations occurring in the vehicle windshield are minimized by the elasticity of the system. Therefore the rearview mirror turns sharper and affords greater safety to the driver of the vehicle.

In accordance with another embodiment, for improving the stability of the support base 5 on the support pad 1 a cuneiform wedge 60 is provided to cooperate with the spring 20. It is located at the corner as defined between the bottom of the fitting groove 12 and the front wall of the support base 5. The wedge has a locking surface 61 including a first inclined part 62 with an upward slope in direction of the fitting motion of the support pad 1 onto the support base 5. A second part 60 extends substantially parallel in direction of the fitting motion from the end of the wedge 63 nearest to the fitting opening 13 in the support base 5. One or more wedges 63 and the locking surface 61 also may be curved in accordance with an additional embodiment.

It will be understood that each of the elements described above, or two or more together, may also find a useful application in other types of constructions differing from the types described above.

While the invention has been illustrated and described as embodied in a fastening device for vehicle accessories, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fastening device for vehicle accessories, comprising a support pad attachable to a windshield of a vehicle; a support base connected with said support pad connected with a rearview mirror; and a resilient locking means located between said support pad and said support base and pressing said support pad and said support base against one another, said resilient locking means being shaped so that a stress generated at said locking means during an assembly of said support base and said support pad is smaller than a stress generated at said locking means during a disassembly of said support base and said support pad, said resilient locking means including a locking spring, said locking spring being substantially filiform and having a U-shaped configuration with an L-shaped profile.

2. A fastening device as defined in claim 1, wherein said locking spring includes a transverse seating branch, two equal and coplanar branches extending perpendicularly from said seating branch parallel to one another and in a fitting direction between said support pad and said support base, each of said two equal and coplanar branches including an intermediate locking fold having a concavity facing toward said support pad, an intermediate rectilinear locking part pressed against said support base, a rectilinear end part extending perpendicular to said intermediate rectilinear part and connected to said transverse seating branch, and a rectilinear free end part which during an assembly of said support pad and said support base does not touch said support base.

3. A fastening device as defined in claim 2, wherein said support pad and said support base define a housing space therebetween, said locking folds of said locking spring having a radius of curvature which is slightly greater than a height of said housing space between said support pad and said support base.

4. A fastening device as defined in claim 2, wherein said housing space includes a recess formed in a bottom of a fitting groove provided in said support base and having a staggered bottom with a deeper area and a shallower area, said intermediate rectilinear locking parts of said locking spring being pressed against said deeper area, while said rectilinear free end parts of said locking spring leaning against said shallower area.

5. A fastening device for vehicle accessories, comprising a support pad attachable to a windshield of a vehicle; a support base connected with said support pad connectable with a rearview mirror; and a resilient locking means located between said support pad and said support base and pressing said support pad and said support base against one another, said resilient locking means being shaped so that a stress generated at said locking means during an assembly of said support base and said support pad is smaller than a stress generated at said locking means during a disassembly of said support base and said support pad, said resilient locking means including a locking spring; and means for assembling said locking spring by pressure onto said support base, said means for assembling including a transverse channel provided on a bottom of said support base and a transverse branch provided in said locking spring and engaging in said transverse channel, aid means for assembling also including side catches provided in said support base and ends parts provided in said locking spring and engaging in said side catches.

6. A fastening device for vehicle accessories, comprising a support pad attachable to a windshield of a vehicle; a support base connected with said support pad connected with a rearview mirror; and a resilient locking means located between said support pad and said support base and pressing said support pad and said support base against one another, said resilient locking means being shaped so that a stress generated at said locking means during an assembly of said support base and said support pad is smaller than a stress generated at said locking means during a disassembly of said support base and said support pad, said resilient locking means including a locking spring; and means for clamping said locking spring onto said support base so as to generate said different assembly and disassembly stresses, said clamping means including recess formed in said support pad, and parallel branches provided in said locking spring and having locking folds with vertices engaging in said recesses.

7. A fastening device for vehicle accessories, comprising a support pad attachable to a windshield of a vehicle; a support base connected with said support pad connected with a rearview mirror; and a resilient locking means located between said support pad and said support base and pressing said support pad and said support base against one another, said resilient locking means being shaped so that a stress generated at said locking means during an assembly of said support base and said support pad is smaller than a stress generated at said locking means during a disassembly of said support base and said support pad, said resilient locking means including a locking spring; and at least one wedge provided in said support base in a corner defined between a bottom and a front wall of said support base and having a locking surface including a first inclined part with a slope in direction of a fitting motion of said support pad and said support base and a second part extending substantially parallel to the direction of the fitting motion.

8. A fastening device as defined in claim 7, wherein said locking surface of said wedge is curved.

9. A fastening device for vehicle accessories, comprising a support pad attachable to a windshield of a vehicle; a support base connected with siad support pad connectable with a rearview mirror; and a resilient locking means located between said support pad and said support base and pressing said support pad and said support base against one another, said resilient locking means being shaped formed so that a stress generated at said locking means during an assembly of said support base and said support pad is smaller than a stress generated at said locking means during a disassembly of said support base and said support pad, said resilient locking means including a locking spring located between said support base and said support pad and having an apex projecting toward said support pad.

10. A fastening device for vehicle accessories, comprising a support pad attachable to a windshield of a vehicle; a support base connected with said support pad and connectable with a rearview mirror; and a resilient locking means pressing said support pad and said support base against one another and formed so that during an assembly and a disassembly of said support base and said support pad different stresses are generated such that a stress generated during the assembly of said support base and said support pad is smaller than a stress generated at said locking means during the disassembly of said support base and said support pad, said resilient means including a locking spring, means for connecting said support pad and support base, said connecting means including swallow tail-shaped formations provided on said support pad and said support base and fitting into one another, said locking spring pressing said swallow tail-shaped formations of said support pad and said support base against one another.

11. A fastening device for vehicle accessories, comprising a support pad attachable to a windshield of a vehicle; a support base connected with said support pad and connectable with a rearview mirror; and a resilient locking means pressing said support pad and said support base against one another and formed so that during an assembly and a disassembly of said support base and said support pad different stresses are generated such that a stress generated during the assembly of said support base and said support pad is smaller than a stress generated at said locking means during the disassembly of said support base and said support pad, said resilient locking means including a locking spring; and means for clamping said locking spring onto said support base so as to generate said different assembly and disassembly stresses.

* * * * *